(12) United States Patent
Aboul-Magd et al.

(10) Patent No.: US 10,615,934 B2
(45) Date of Patent: *Apr. 7, 2020

(54) SYSTEM AND METHOD FOR ORTHOGONAL FREQUENCY DIVISION MULTIPLE ACCESS COMMUNICATIONS

(71) Applicant: Huawei Technologies Co., Ltd., Shenzhen (CN)

(72) Inventors: Osama Aboul-Magd, Kanata (CA); Jung Hoon Suh, Kanata (CA); Kwok Shum Au, Shenzhen (CN); Sheng Sun, Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,010

(22) Filed: Apr. 12, 2018

(65) Prior Publication Data

US 2018/0234217 A1     Aug. 16, 2018

Related U.S. Application Data

(63) Continuation of application No. 14/699,842, filed on Apr. 29, 2015, now Pat. No. 9,954,663, which is a continuation of application No. 61/991,024, filed on May 9, 2014.

(51) Int. Cl.
| | |
|---|---|
| *H04L 5/00* | (2006.01) |
| *H04W 72/12* | (2009.01) |
| *H04W 72/04* | (2009.01) |
| *H04W 72/02* | (2009.01) |
| *H04W 84/12* | (2009.01) |

(52) U.S. Cl.
CPC ............. *H04L 5/005* (2013.01); *H04W 72/02* (2013.01); *H04W 72/121* (2013.01); *H04L 5/0007* (2013.01); *H04L 5/0037* (2013.01); *H04L 5/0091* (2013.01); *H04W 72/0446* (2013.01); *H04W 84/12* (2013.01)

(58) Field of Classification Search
CPC ...... H04W 70/02; H04W 84/12; H04L 5/0007
USPC .................................. 370/324–343, 431–465
See application file for complete search history.

(56) References Cited

U.S. PATENT DOCUMENTS

| | | |
|---|---|---|
| 8,867,574 B2 | 10/2014 | Van Nee et al. |
| 2008/0107061 A1 | 5/2008 | Tao et al. |
| 2009/0310692 A1 | 12/2009 | Kafle et al. |
| 2010/0027694 A1 | 2/2010 | Touboul et al. |
| 2014/0369276 A1 | 12/2014 | Porat et al. |

(Continued)

FOREIGN PATENT DOCUMENTS

| | | |
|---|---|---|
| CN | 101453314 A | 6/2009 |
| CN | 101465846 A | 6/2009 |

(Continued)

OTHER PUBLICATIONS

Aizi, S., et al., "OFDMA Numberology and Structure," IEEE 802.11-15/0330r1, Mar. 9, 2015, 38 pages.

(Continued)

*Primary Examiner* — Iqbal Zaidi

(57) ABSTRACT

A method for operating a communications device adapted for orthogonal frequency division multiple access (OFDMA) wireless local area network (WLAN) communications includes generating an OFDMA preamble comprising an OFDMA signal (SIG) field including an indication of an allocation of an OFDMA resource to a station, and transmitting the OFDMA preamble in a frame.

22 Claims, 16 Drawing Sheets

(56) References Cited

U.S. PATENT DOCUMENTS

| | | |
|---|---|---|
| 2014/0369333 A1 | 12/2014 | Porat |
| 2015/0139119 A1 | 5/2015 | Azizi et al. |
| 2015/0172011 A1* | 6/2015 | Aboul-Magd ........ H04L 5/0007 370/330 |
| 2016/0337100 A1 | 11/2016 | Yang et al. |
| 2016/0360528 A1* | 12/2016 | Kim .................. H04W 74/0816 |

FOREIGN PATENT DOCUMENTS

| | | |
|---|---|---|
| CN | 101536433 A | 9/2009 |
| CN | 105940650 A | 9/2016 |

OTHER PUBLICATIONS

"IEEE Standard for Information Technology Telecommunications and Information Exchange Between Systems Local and Metropolitan Area Networks Specific Requirements; Part 11: Wireless LAN Medium Access Control (MAC) and Physical Layer (PHY) Specifications," IEEE P802.11-REVmc/D2.5, Mar. 2014, 3554 pages.

Kim, et al., "GroupID Concept for Downlink MU-MIMO Transmission," IEEE 802.11-10/0073r2, Mar. 15, 2010, Joonsuk Kim, Broadcom Corp., 10 pages.

Kneckt, et al., "Indication of Group Address in PLCP Header," IEEE 802.11-11/0095r1, Jan. 19, 2011, 2 pages.

\* cited by examiner

SYSTEM AND METHOD FOR ORTHOGONAL FREQUENCY DIVISION MULTIPLE ACCESS COMMUNICATIONS

CROSS-REFERENCE TO RELATED APPLICATIONS

This application is a continuation of U.S. patent application Ser. No. 14/699,842, filed on Apr. 29, 2015, which claims the benefit of U.S. Provisional Application No. 61/991,024, filed on May 9, 2014, all of which applications are hereby incorporated herein by reference.

TECHNICAL FIELD

The present disclosure relates generally to digital communications, and more particularly to a system and method for orthogonal frequency division multiple access (OFDMA) communications.

BACKGROUND

Technical work in the IEEE 802.11ax project is expected to have some focus on introducing OFDMA to wireless local area network (WLAN) standard. In WLAN, a physical (PHY) layer preamble is included in a frame. The PHY layer preamble is used to synchronize a receiver of the frame to a transmitter of the frame and to convey to the receiver important parameters related to decoding the frame.

SUMMARY

Example embodiments of the present disclosure provide a system and method for orthogonal frequency division multiple access (OFDMA) communications.

In accordance with an example embodiment of the present disclosure, a method for operating a communications device adapted for orthogonal frequency division multiple access (OFDMA) wireless local area network (WLAN) communications is provided. The method includes generating, by the communications device, an OFDMA preamble comprising an OFDMA signal (SIG) field including an indication of an allocation of an OFDMA resource to a station, and transmitting, by the communications device, the OFDMA preamble in a frame.

In accordance with another example embodiment of the present disclosure, a method for operating a communications device adapted for orthogonal frequency division multiple access (OFDMA) wireless local area network (WLAN) communications is provided. The method includes receiving, by the communications device, a frame including an OFDMA preamble comprising an OFDMA signal (SIG) field with an indication of an allocation of an OFDMA resource to a station, and receiving, by the communications device, a data transmission in accordance with the indication of the allocation.

In accordance with another example embodiment of the present disclosure, a communications device adapted for orthogonal frequency division multiple access (OFDMA) wireless local area network (WLAN) communications is provided. The communications device includes a processor, and a computer readable storage medium storing programming for execution by the processor. The programming including instructions to generate an OFDMA preamble comprising an OFDMA signal (SIG) field including an indication of an allocation of an OFDMA resource to a station, and transmit the OFDMA preamble in a frame.

In accordance with another example embodiment of the present disclosure, a communications device adapted for orthogonal frequency division multiple access (OFDMA) wireless local area network (WLAN) communications is provided. The communications device includes a processor, and a computer readable storage medium storing programming for execution by the processor. The programming including instructions to receive a frame including an OFDMA preamble comprising an OFDMA signal (SIG) field with an indication of an allocation of an OFDMA resource to a station, and receive a data transmission in accordance with the indication of the allocation.

Practice of the foregoing embodiments enables OFDMA operation while maintaining compatibility with legacy WLAN devices.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to OFDMA communications. For example, a communications device generates an OFDMA preamble comprising an OFDMA signal (SIG) field including an OFDMA resource allocation map allocating OFDMA resources (e.g., subchannels) to stations, and transmits the OFDMA preamble in a frame.

The present disclosure will be described with respect to example embodiments in a specific context, namely communications systems that use OFDMA communications techniques. The disclosure may be applied to standards compliant communications systems, such as those that are compliant with IEEE 802.11, and the like, technical standards, and non-standards compliant communications systems, that use OFDMA communications techniques.

Figure 1:
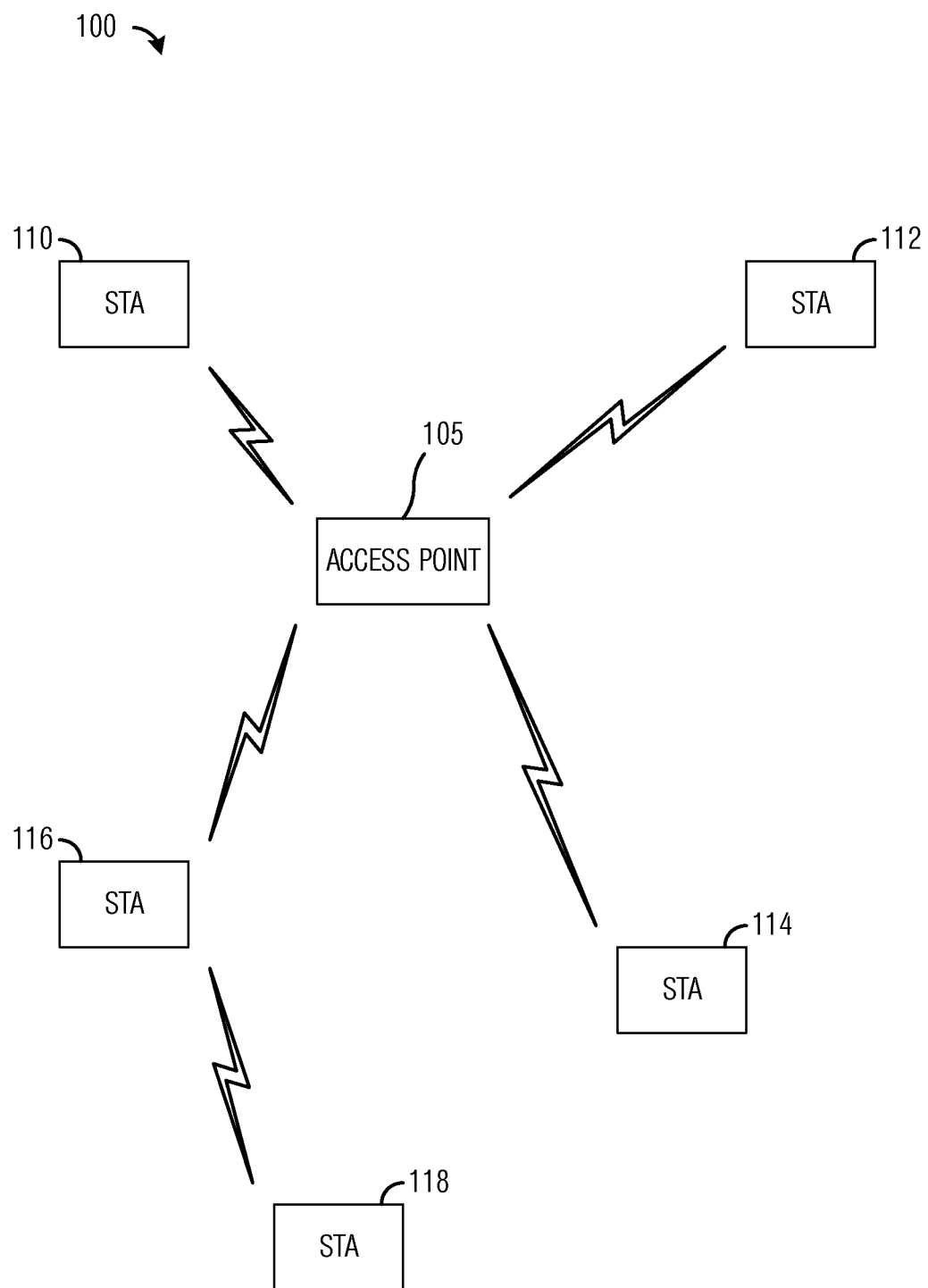
FIG. 1 illustrates an example communications system according to example embodiments described herein.

FIG. 1 illustrates an example communications system 100. Communications system 100 includes an access point (AP) 105 that is serving a plurality of devices, such as device no, device 112, device 114, device 116, and device 118. An AP may also be commonly referred to as a base station, a communications controller, a controller, a NodeB, an evolved NodeB (eNB), and the like. A device may also be commonly referred to as a station (STA), a user equipment (UE), a mobile station, a mobile, a user, a subscriber, a terminal, and the like. In a first communications mode, the devices may communicate through AP 105 by transmitting a frame to AP 105, which forwards the frame to its intended recipient. In a second communications mode, a first device may transmit a frame directly to a second device without having to go through AP 105. Communications with between the AP and STAs in a basic service set (BSS) can be in the uplink (UL) or the downlink (DL) directions. The OFDMA resource allocation described herein is applicable in both directions.

While it is understood that communications systems may employ multiple APs capable of communicating with a number of stations, only two APs, and a number of stations are illustrated for simplicity.

Figure 2:
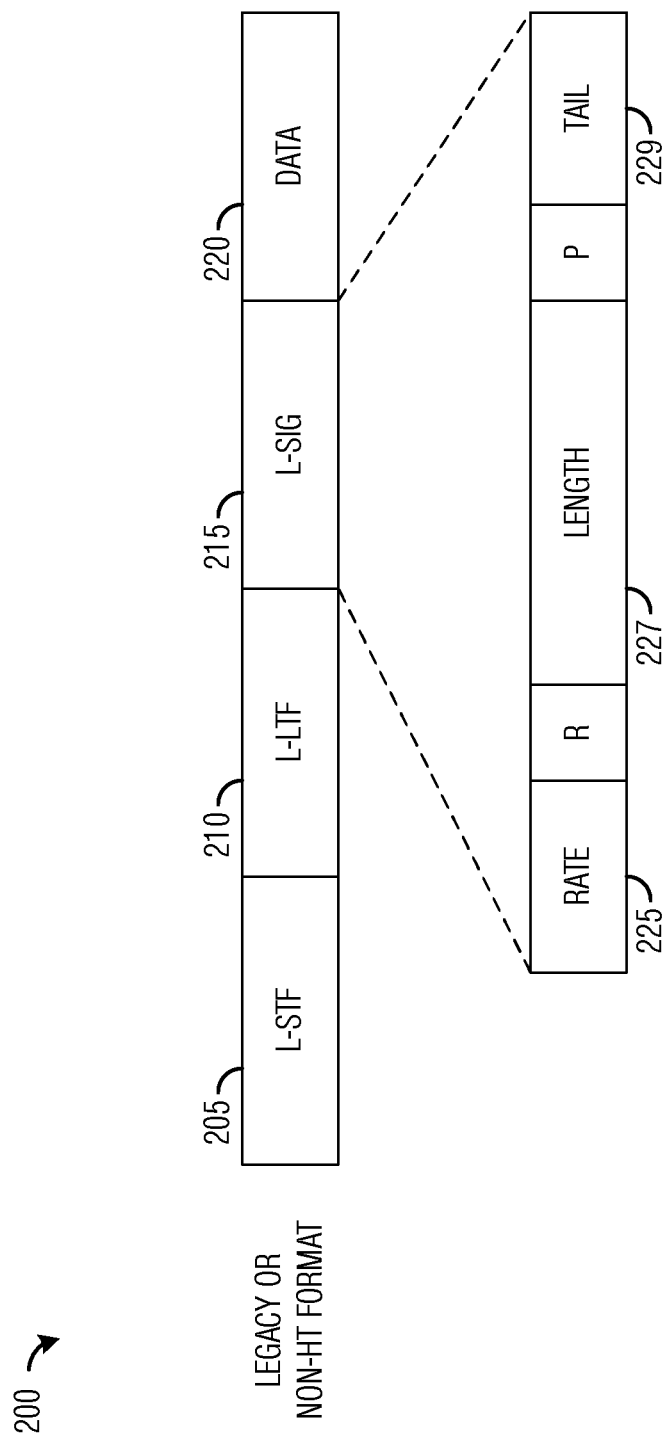
FIG. 2 illustrates a structure of a frame generated by devices supporting IEEE 802.11a/g.

FIG. 2 illustrates a structure of a frame 200 generated by devices supporting IEEE 802.11a/g. Devices that support IEEE 802.11a and/or IEEE 802.14 are referred to as legacy devices, and the related preamble is referred to as a legacy preamble or L-preamble for short. Frame 200 includes a preamble (legacy preamble or L-Preamble) consists of a short training field (STF) (referred to as a legacy STF or L-STF) 205, a long training field (LTF) (referred to as a legacy LTF or L-LTF) 210, and a signal field (SIG) (referred to as a legacy SIG or L-SIG) 215. Frame 200 also includes a data field 220. While L-STF field 205 and L-LTF field 210 include reference signals for channel estimation and automatic gain control, L-SIG field 215 includes parameters required for decoding the received frame, such as a PHY rate field (RATE) 225 used for transmitting the frame and a frame length field (LENGTH) 227 used to indicate a length of frame 200. L-SIG field 215 also includes other fields, such as reserved fields, and a tail field 229.

A High Efficiency WLAN (HEW) task group, referred to as HEW TG, is considering techniques that improve the spectral efficiency of WLAN to enhance overall system throughput and/or coverage area in dense deployment scenarios that are characterized by large number of APs in a limited geographical area and large number of STAs associated with each AP. HEW TG has provided a WLAN frame commonly referred to as a HEW frame. The HEW frame maintains compatibility with legacy devices by preserving the L-STF, L-LTF, and L-SIG fields, i.e., the legacy preamble. By preserving the legacy preamble, the HEW frame allows interoperability and coexistence with legacy (IEEE 802.11a/b/g/n/ac) devices. Newly defined HEW functionality is supported by the addition of additional fields in a HEW preamble. The HEW preamble is located in what would be interpreted as a data field by legacy devices. As an illustrative example, the HEW preamble may indicate the type of physical protocol data unit (PPDU) supported, i.e., orthogonal frequency division multiplexed (OFDM) or OFDMA PPDU. The HEW preamble may include a sufficient number of LTFs for use in channel estimation.

IEEE 802.11ac provides another WLAN frame referred to as a very high throughput (VHT) frame. As with the HEW frame, the VHT frame maintains compatibility with legacy devices by preserving the L-STF, L-LTF, and L-SIG fields. Newly defined VHT functionality is supported by the addition of additional fields in a VHT preamble.

Figure 3A:
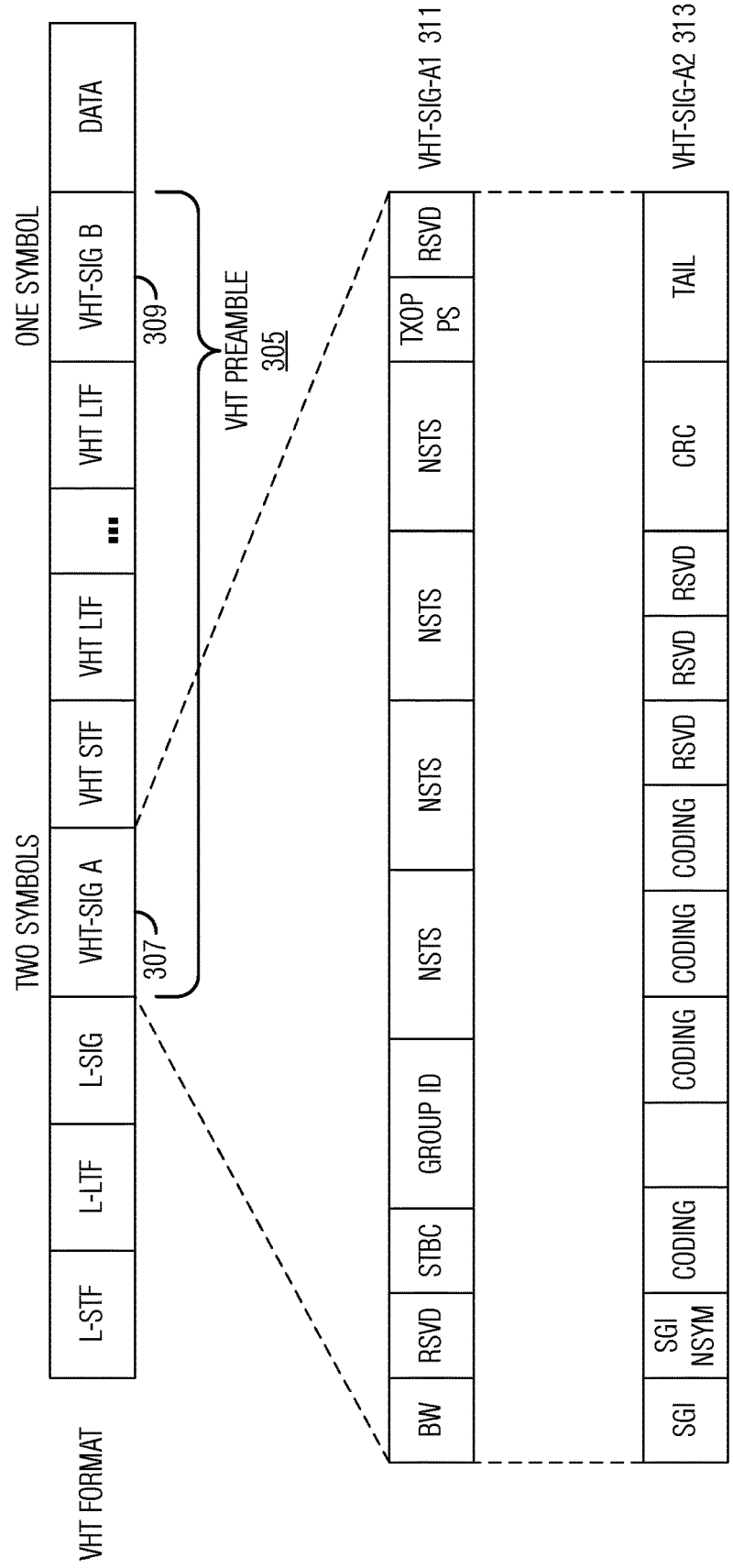
FIG. 3a illustrates a structure of a VHT frame generated by IEEE 802.11ac devices.

FIG. 3a illustrates a structure of a VHT frame 300 generated by IEEE 802.11ac devices. As discussed previously, VHT frame 300 includes the L-STF, L-LTF, and L-SIG fields to maintain compatibility with legacy devices. VHT frame 300 also includes a VHT preamble 305 which includes VHT signals fields: VHT-SIG A 307 and VHT-SIG B 309. The VHT signal fields may include information that describes the payload of VHT frame 300. The VHT signal fields may help the receiver decode the payload of VHT frame 300. VHT-SIG A 307 is two symbols in length. The formats of the two symbols in VHT-SIG A 307 are shown in FIG. 3 as VHT-SIG-A1 311 for the first symbol and VHT-SIG-A2 313 for the second symbol. VHT preamble 305 also includes STFs and LTFs to help the receiver perform channel estimation, tuning, and the like.

Figure 3B:
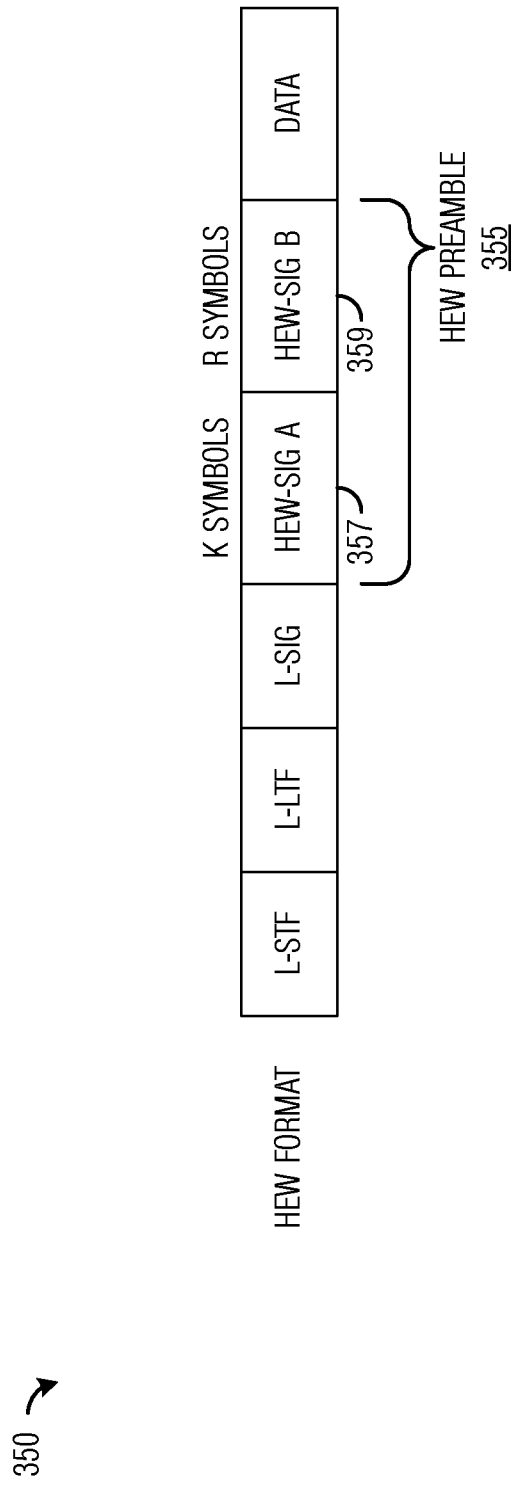
FIG. 3b illustrates a structure of a HEW frame generated by HEW compatible devices.

FIG. 3b illustrates a structure of a HEW frame 350 generated by HEW compatible devices. As discussed previously, HEW frame 350 includes the L-STF, L-LTF, and L-SIG fields to maintain compatibility with legacy devices. HEW frame 350 also includes a HEW preamble 355 which includes HEW signal fields: HEW-SIG A 357 and HEW-SIG B 359. The HEW signal fields may include information that describes the payload of HEW frame 350. The HEW signal fields may help the receiver decode the payload of HEW frame 350. HEW-SIG-A 357 is K OFDM symbols in length, while HEW SIG-B 359 is R OFDM symbols in length, where K and R are integer values. HEW preamble 355 also includes STFs and LTFs to help the receiver perform channel estimation, tuning, and the like. As in VHT SIG fields, the HEW SIG-A field includes information that are common to all STAs and is decoded by all STAs. It is usually transmitted in the legacy format to allow all STAs including legacy STAs to be able to decode the field. HEW SIG-B includes per STA information and is only decoded by HEW STAs. Therefore HEW SIG-B can be transmitted in a format different from the legacy format. In HEW frame, the HEW SIG-B follows directly after the HEW SIG-A.

The HEW frame and the VHT frame share a very similar structure in that their respective SIG A fields (HEW-SIG A and VHT-SIG A) are received and decoded by all stations, while the VHT-SIG B fields are intended for a single station. Furthermore, the VHT-SIG B fields are beamformed.

Figure 4:
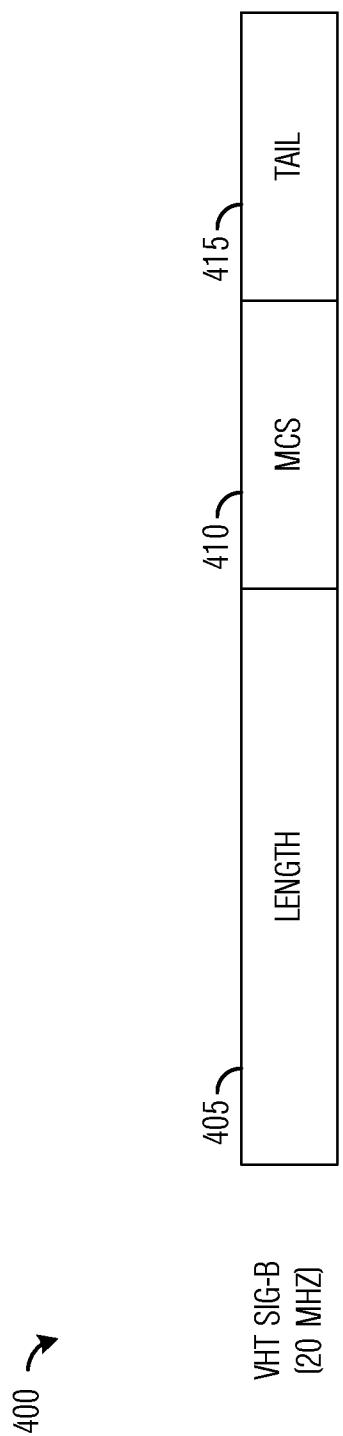
FIG. 4 illustrates a structure of a VHT-SIG B field for a 20 MHz channel.

FIG. 4 illustrates a structure of a VHT-SIG B field 400 for a 20 MHz channel. VHT-SIG B field 400 includes a length field 405, a modulation and coding scheme (MCS) field 410, and a tail field 415. VHT-SIG B field 400 may be beamformed and transmitted using VHT format (52+4 for a 20 MHz PPDU). For the 20 MHz channel, VHT-SIG B field 400 may be 26 bits long. For wider channels, the VHT-SIG B field may be repeated following patterns as specified in the IEEE 802.11ac technical standards.

IEEE 802.11ac supports downlink multi-user multiple input multiple output (MU-MIMO) operation, wherein a receiver or receivers may receive multiple simultaneously transmitted data streams from multiple transmit antennas. The multiple transmit antennas may be located at a single AP, or distributed but controlled by a single AP. Downlink MU-MIMO is supported through the concept of a group identifier (GrpID) that is signaled by the AP to associated stations to identify the recipients of the MU-MIMO DL transmission. APs may arrange associated stations into groups. Each group may include up to 4 stations. Each group may be assigned a GrpID, but a single GrpID may refer to multiple groups (which is referred to as overloading). Each station in a group has a fixed position within the group (up to 4 positions are allowed). A station's position is used to refer to the order in a number of space-time streams (NSTS or $N_{STS}$) field where a station is informed regarding how many spatial streams are assigned to the station.

In U.S. patent application Ser. No. 14/325,136, filed Jul. 7, 2014, entitled "System and Method for WLAN OFDMA Design of Subcarrier Groups and Frame Format," which is hereby incorporated herein by reference, the concept of subcarrier groups (SCGs) is introduced. In SCGs, the number of subcarriers in an OFDM symbol is divided into a number of groups. The AP controls the allocation of the subcarriers to the different SCGs. The number of subcarriers per SCG may be different from one group to the other. The AP communicates the allocation of subcarriers to SCG to stations. The SCGs are ordered and allocated by the AP to OFDMA stations based on some criteria including performance requirements, e.g., peak rate, buffer size, delay bounds, etc. The number of subcarriers in a symbol is assumed to be $N_{sc}$ subcarriers and for subcarrier group i, there are assigned $N_{SCGi}$ subcarriers. The sum of $N_{SCGi}$ over all i should be less or equal to $N_{sc}$. The number of SCGs is set to m.

Figure 5A:
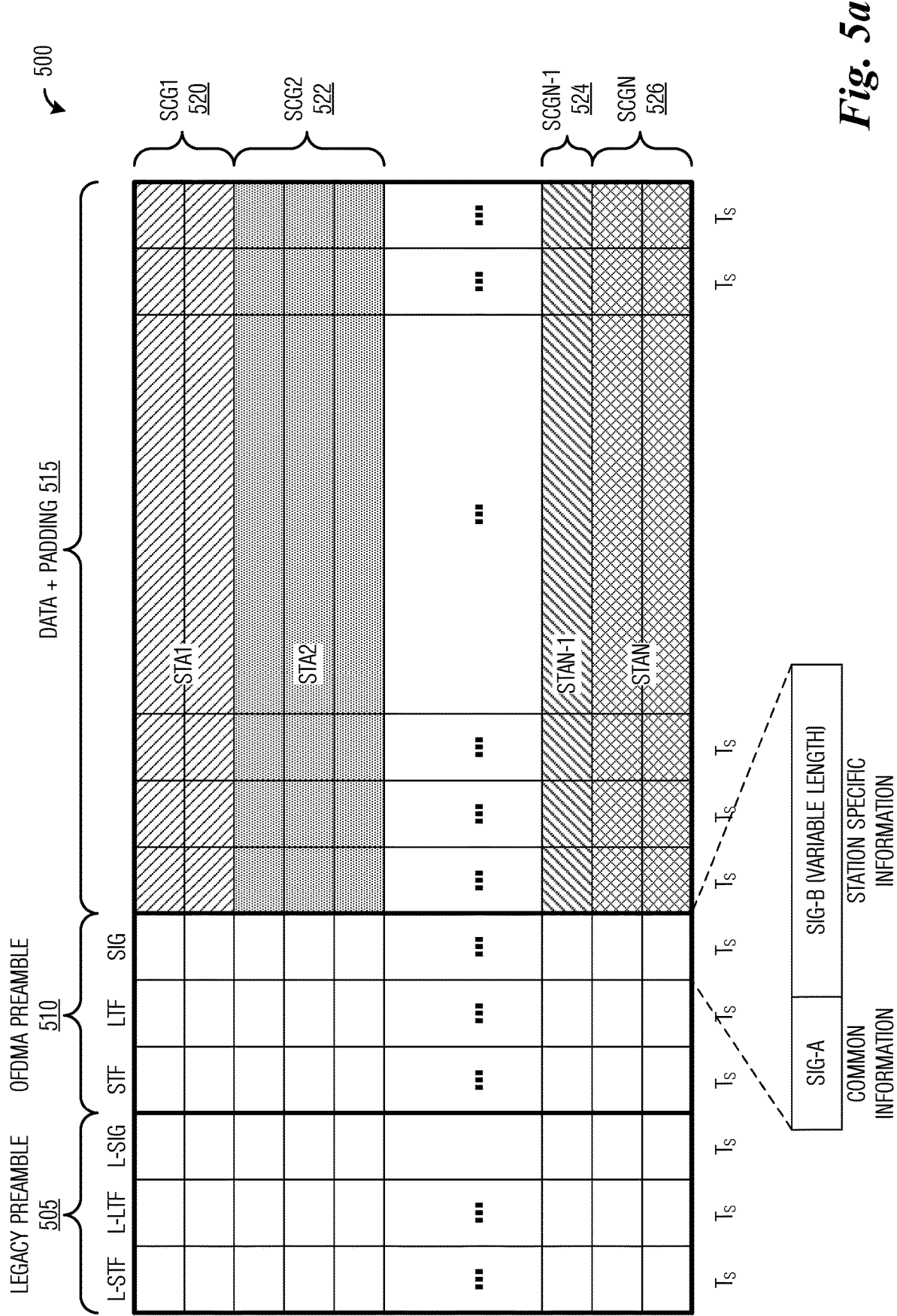
FIG. 5a illustrates an example OFDMA frame highlighting subcarriers according to example embodiments described herein.

FIG. 5a illustrates an example OFDMA frame 500 highlighting subcarriers. OFDMA frame 500 includes a legacy preamble 505, an OFDMA preamble 510, and a data+padding field 515. OFDMA frame 500 may be divided into a plurality of subcarriers and one or more subcarriers may be collectively assigned to different stations. Each one or more subcarrier collection may be referred to as a SCG. As shown in FIG. 5a, SCG1 520 is assigned to STA1, SCG2 522 is assigned to STA2, SCGN-1 524 is assigned to STAN-1, and SCGN 526 is assigned to STAN. Other subcarrier collections are possible, as well as other subcarrier collection to station assignments are possible. OFDMA preamble 510 includes a SIG field that includes a SIG-A portion and a SIG-B portion. The SIG-A portion may include common information for all stations, while the SIG-B portion includes station specific information. Legacy preamble 505 and OFDMA preamble 510 may be present in all of the subcarriers of OFDMA frame 500.

In U.S. Provisional Patent Application 61/917,791, filed Dec. 18, 2013, entitled "System and Method for WLAN OFDMA Design of Subcarrier Groups and Frame Format," which is hereby incorporated herein by reference, a WLAN-friendly design utilizing SCGs is introduced. OFDM subcarriers are divided into a number of SCGs. The SCGs are allocated to OFDMA users for the duration of an aggregated media access control (MAC) protocol data unit ((A)-MPDU). The use of the PHY preamble (a high efficiency WLAN (HEW) preamble, for example) to convey the allocation of the SCGs and number of spatial streams, and possibly other information related to resource allocation, to stations (also commonly referred to as an OFDMA resource allocation map) is a desirable objective of the design. The allocation can change from one frame to the other based on users requirements. The design reduces overhead associated with communicating the OFDMA resource allocation map.

The AP and the associated stations may need to know the SCG indices and how many subcarriers and the number of these subcarriers are allocated to each SCG. The AP can perform the division of subcarriers into SCGs (which may also be referred to as subchannels) and communicate this information (the SCG indices, and for each SCG: the number of subcarriers and the numbers of the subcarriers allocated to the SCG) to the associated stations in a management frame, for example.

Figure 5B:
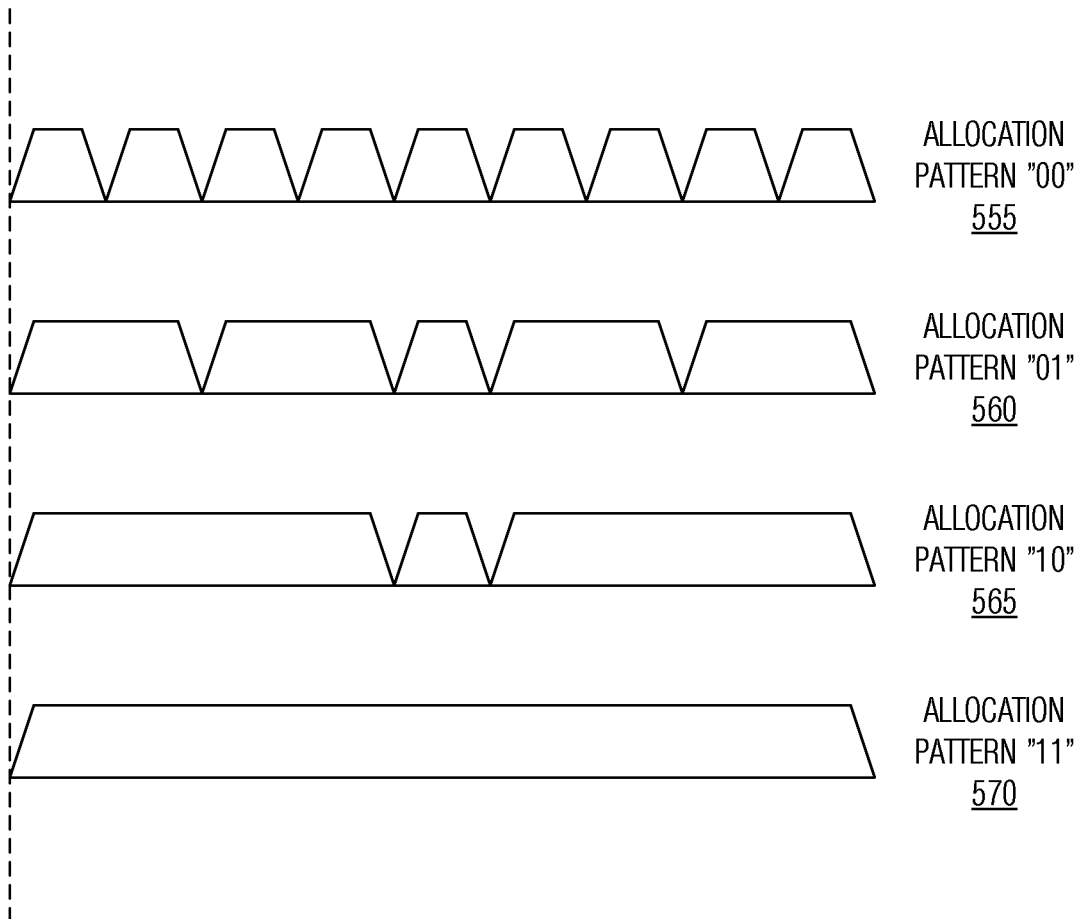
FIG. 5b illustrates an example configuration of predefined SCGs according to example embodiments described herein.

FIG. 5b illustrates an example configuration of predefined SCGs 550. SCGs may be predefined as a set of multiple SCG allocation patterns. As shown in FIG. 5b, a 20 MHz channel using 256 FFT points is configured into 4 different SCG allocation patterns: allocation pattern 00 555, allocation pattern 01 560, allocation pattern 10 565, and allocation pattern 11 570. Allocation pattern 00 555 is formed from nine 26-subcarrier subchannels, allocation pattern 01 560 is formed from four 52-subcarrier SCGs+one 26-subcarrier SCG, allocation pattern 10 565 is formed from two 108-subcarrier SCGs+one 26-subcarrier SCG, and allocation pattern 11 570 is formed from a single 242-subcarrier SCG. OFDMA resource allocation may only be performed using one or more of the constructed SCGs. Each of allocation patterns may be indicated by a 2-bit allocation indication, e.g. 00 represents a resource in allocation pattern 00 555, of represents a resource in allocation pattern 01 560, 10 represents a resource in allocation pattern 10 565, and 11 represents a resource in allocation pattern 11 570. Both the AP and the stations know the allocation patterns and associated indications, so the AP only has to signal an indication to the station(s). In situations with a channel that is wider than 20 MHz, additional bits may be needed to indicate the allocation pattern. It is noted that predefined SCGs 550 shown in FIG. 5b is for discussion purposes only and is not intended to be exhaustive. Other predefined SCGs are possible, therefore the discussion of predefined SCGs 550 should not be intended to be limiting to either the scope or the spirit of the example embodiments.

According to an example embodiment, a preamble design for a WLAN communications system supporting OFDMA is provided. As an illustrative example, the SIG field(s) is used to convey an indication of an allocation of an OFDMA resource (e.g., OFDMA resource allocation map for instance) to stations. As another illustrative example, a PHY layer preamble is presented that supports the distribution of the indications of the allocations of OFDMA resources (e.g., OFDMA resource allocation maps) in a WLAN communications system supporting OFDMA. As yet another illustrative example, an indication of an allocation of an OFDMA resource (e.g., an OFDMA resource allocation map) is communicated to participating users in the SIG field(s) of a HEW preamble.

According to an example embodiment, a preamble design (in particular a SIG field design) that is suitable for a WLAN communications system supporting OFDMA transmission format is provided. In OFDMA, multiple stations are multiplexed in the frequency domain and share transmission resources in terms of the number of subcarriers. In order to facilitate OFDMA operation, an indication of an allocation of an OFDMA resource (e.g., an OFDMA resource allocation map) is communicated to the different participating stations to indicate which subcarriers are allocated to which stations.

In general, there are two forms of OFDMA supported: single user MIMO (SU-MIMO) and MU-MIMO. In SU-MIMO, an AP selects stations to participate in the OFDMA transmissions and allocates a number of spatial-time streams ($N_{STS}$) to each station based on its channel conditions. More $N_{STS}$ are allocated to stations with good channel conditions compared to those stations with poor channel conditions. Good channel conditions are reflected by measures such as signal to noise ratio (SNR) and signal plus interference to noise ratio (SINR). The maximum number of $N_{STS}$ that can be allocated to each station is limited by the number of antennas the station supports.

Figure 6:
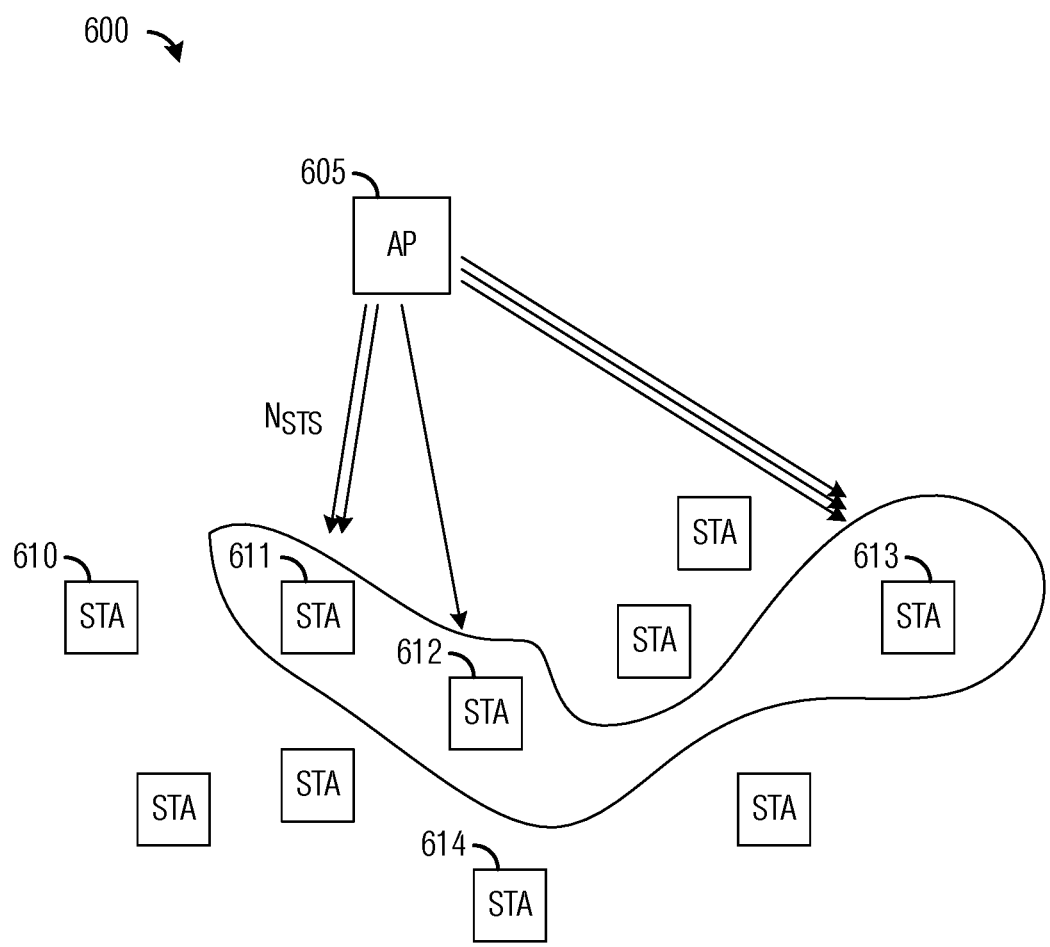
FIG. 6 illustrates an example communications system highlighting OFDMA groups according to example embodiments described herein.

FIG. 6 illustrates an example communications system 600 highlighting OFDMA groups. Communications system 600 includes an AP 605 serving a plurality of stations (STAs), such as station 610, station 611, station 612, station 613, and station 614. As shown in FIG. 6, an OFDMA group is formed with stations 611, 612, and 613, with station 611 being assigned 2 STS, station 612 assigned 1 STS, and station 613 assigned 3 STS. The OFDMA group is identified by its GrpID and each OFDMA station is assigned a number of STS ($N_{STS}$). As an illustrative example, up to 8 STS may be assigned to each station simultaneously. Each OFDMA station is assigned a SCG, where an SCG index as determined by the station's position in the group is also informed to the OFDMA station. Group size may be enlarged to include more stations.

Figure 7:
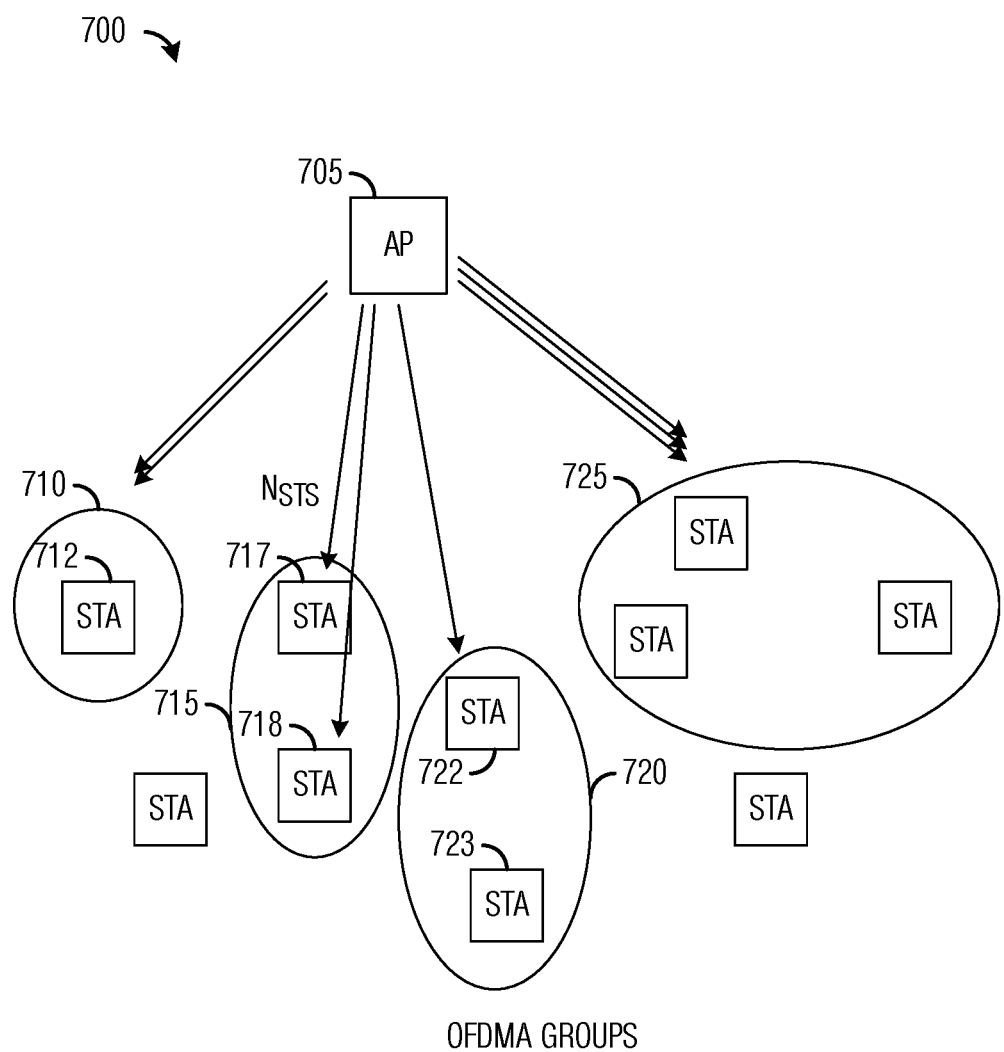
FIG. 7 illustrates an example communications system highlighting downlink single user OFDMA (SU-OFDMA) and multi user OFDMA (MU-OFDMA) according to example embodiments described herein.

FIG. 7 illustrates an example communications system 700 highlighting downlink single user OFDMA (SU-OFDMA) and multi user OFDMA (MU-OFDMA). Communications system 700 includes an AP 705 serving a plurality of stations, such as station 712, stations 717-718, and stations 722-723. As shown in FIG. 7, multiple OFDMA groups are formed. As an illustrative example, OFDMA group 710 may include a single station, station 712. When an OFDMA group includes only a single station, such as with OFDMA group 710, all of the resources of a subchannel or SCG that is assigned to the OFDMA group is assigned to the single station. Such a situation may be referred to as SU-OFDMA. While other OFDMA groups may include 2 or more stations, such as OFDMA group 715 includes stations 717-718, OFDMA group 720 includes stations 722-723, and OFDMA group 725 includes 3 stations. When an OFDMA group includes a plurality of stations, the situation may be referred to as MU-OFDMA.

Each OFDMA group may be assigned up to L STS, where L is an integer value (such as 2, 4, 8, or 16, for example) with $N_{STS}$ being allocated per station within an OFDMA group. Downlink MU-MIMO OFDMA may be similar to downlink SU-MIMO OFDMA being repeated as many times as there are multiplexed OFDMA groups. It is noted that in downlink MU-MIMO OFDMA, the number of $N_{STS}$ allocated to each OFDMA group is allocated to stations within the OFDMA group.

AP 705 may arrange stations into groups, with the group size expected to be B, where B is an integer value, such as 4, 8, 16, and the like, for example. There may be a limit on the number of stations in a single group. The GrpID may refer to a group of stations arranged in some order so that {STA1, STA2, STA3, . . . , STAN}. The position of a station within the group indicates the SCG index assigned to the station. If the position of a station changes, the change in position is signaled to the station(s) involved. If more resources are required for a particular station, the station may appear in the group more than once. As with the MU-MIMO grouping concept, the position of the station in the group will determine the index of the $N_{STS}$ value assigned to the station. For SU-OFDMA wherein an OFDMA group consists of a single station, the station is identified by its station identifier (STAID). STAID may be set to the association ID (AID), a partial AID (PAID), or even the MAC address of the station, for example.

According to an example embodiment, an OFDMA frame uses the same frame structure as a HEW frame supporting OFDMA with additional symbols in the HEW signal fields (e.g., HEW-SIG A and/or HEW-SIG B) to enable distribution of an indication of an allocation of an OFDMA resource (e.g., an OFDMA resource allocation map).

Figure 8A:
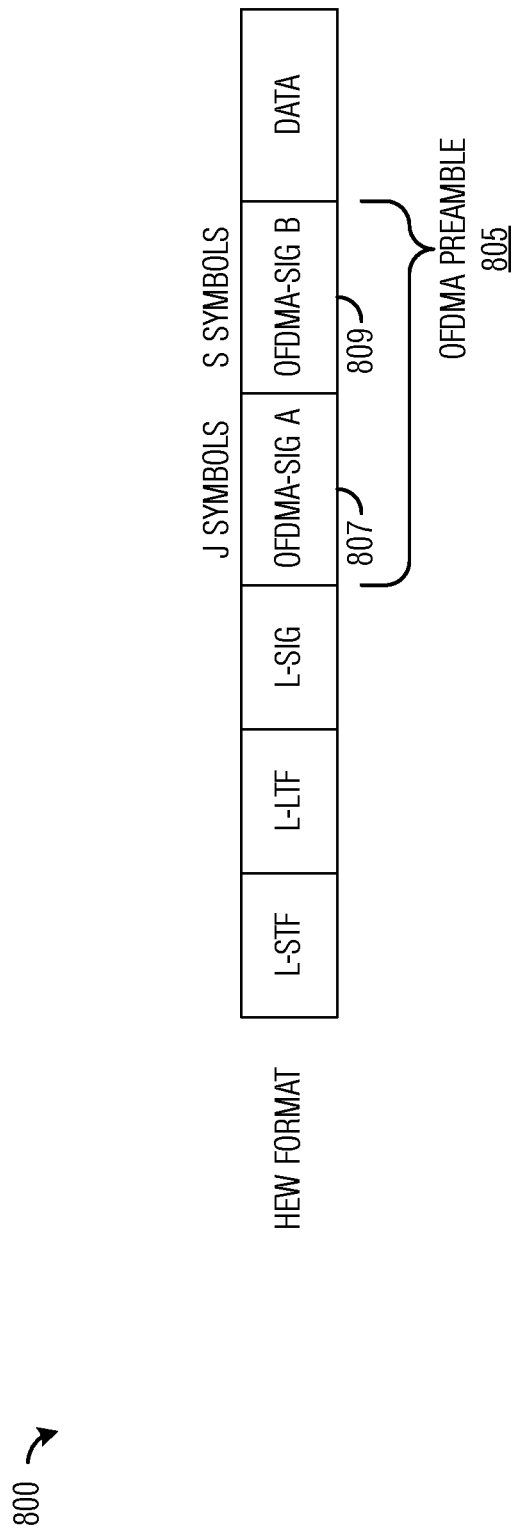
FIG. 8a illustrates an example OFDMA frame according to example embodiments described herein.

FIG. 8a illustrates an example OFDMA frame 800. OFDMA frame 800 includes the L-STF, L-LTF, and L-SIG fields to maintain compatibility with legacy devices. OFDMA frame Boo also includes an OFDMA preamble 805 which includes OFDMA signals fields: OFDMA-SIG A 807 and OFDMA-SIG B 809. The OFDMA signal fields may include information that describes the payload of OFDMA frame 800. The OFDMA signal fields may help the receiver decode the payload of OFDMA frame 800. OFDMA-SIG A 807 is J symbols in length, while OFDMA-SIG B 809 is S symbols in length, where J and S are integer values that are determined by communications system parameters. OFDMA preamble 805 also includes STFs and LTFs to help the receiver perform channel estimation, tuning, and the like. The STFs and LTFs may be located after OFDMA-SIG B 809, for example.

OFDMA-SIG A 807 may be transmitted using a legacy format (e.g., 64 FFT, 48-data+4-pilots). Following OFDMA-SIG A 807 may be a number of OFDMA-STF and OFDMA-LTF fields, which may be similar to or the same as HEW-STF and HEW-LTF fields. Alternatively, the OFDMA-STF and OFDMA-LTF fields may follow OFDMA-SIG B 809. The number of OFDMA-LTF symbols may depend on how many streams are beamformed. OFDMA-SIG A 807, the OFDMA-STF, and the OFDMA-LTF fields may be transmitted using the OFDMA format (a HEW specified format). OFDMA-SIG B 809 may include information related to individual stations.

Figure 8B:
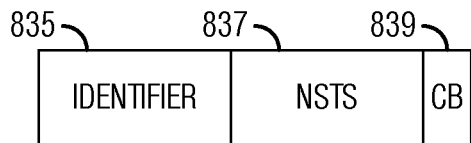
FIG. 8b illustrates a first example OFDMA allocation element according to example embodiments described herein.

FIG. 8b illustrates a first example OFDMA allocation element 830. OFDMA allocation element 830 may be used to signal OFDMA configuration information for a single group or station. OFDMA allocation element 830 may be used in the allocation of a single SCG. OFDMA allocation element 830 may include an identifier field 835 comprising an identifier value (a GrpID for MU-OFDMA or a StationID (STAID) for SU-OFDMA); a NSTS field 837 comprising a NSTS allocated to each station in the group or to the station; and a continuation bit (CB) field 839 comprising an indicator (e.g., 1-bit) to indicate if additional OFDMA allocation elements follow. Other fields may also be included to aid the receiver to decode the received signal, e.g., the modulation and coding scheme (MCS) used. As an illustrative example, identifier field 835 may be n-bits in size with a first bit being used to indicate SU-OFDMA or MU-OFDMA operation; NSTS field 837 may be a single value for SU-OFDMA operation or multiple values for MU-OFDMA operation; and CB field 839 may be set to a first value to indicate that at least one additional OFDMA allocation element follows or a second value to indicate that no more additional OFDMA allocation elements follow.

Figure 8C:
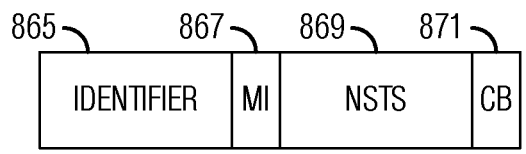
FIG. 8c illustrates a second example OFDMA allocation element according to example embodiments described herein.

FIG. 8c illustrates a second example OFDMA allocation element 860. OFDMA allocation element 860 may be used to signal OFDMA configuration information for a single group or station. OFDMA allocation element 860 may be used in the allocation of one or more SCGs. OFDMA allocation element 860 may include an identifier field 865 comprising an identifier value (a GrpID for MU-OFDMA or a StationID for SU-OFDMA); a multiples (MI) field 867 comprising a count of how many SCGs are allocated to each station in the group or to the station; a NSTS field 869 comprising a NSTS allocated to each station in the group or to the station; and a continuation bit (CB) field 871 comprising an indicator (e.g., 1-bit) to indicate if additional OFDMA allocation elements follow. As an illustrative example, identifier field 865 may be n-bits in size with a first bit being used to indicate SU-OFDMA or MU-OFDMA operation; MI field 867 may be a single value for SU-OFDMA operation or multiple values for MU-OFDMA operation (in either situation, the count begins at a set value, e.g., 0); NSTS field 869 may be a single value for SU-OFDMA operation or multiple values for MU-OFDMA operation; and CB field 871 may be set to a first value to indicate that at least one additional OFDMA allocation element follows or a second value to indicate that no more additional OFDMA allocation elements follow. Other fields may also be included to aid the receiver in decoding the received signal, e.g., the modulation and coding scheme (MCS) used.

Figure 8D:
FIG. 8d illustrates a third example OFDMA allocation element according to example embodiments described herein.

FIG. 8d illustrates a third example OFDMA allocation element 880. OFDMA allocation element 880 may be used to signal OFDMA configuration information where an allocation category is used to indicate the resource allocated for each station in SU-OFDMA or to a group in MU-OFDMA. OFDMA allocation element 880 may include an identifier field 885 comprising an identifier value (a GrpID for MU-OFDMA or a StationID for SU-OFDMA); a SCG category indicator field 887 comprising an indicator of an allocation category assigned; a NSTS field 889 comprising a NSTS allocated to each station in the group or to the station; and a continuation bit (CB) field 891 comprising an indicator (e.g., 1-bit) to indicate if additional OFDMA allocation elements follow. Other fields may also be included to aid the receiver in decoding the received signal, e.g., the modulation and coding scheme (MCS) used.

Figure 9A:
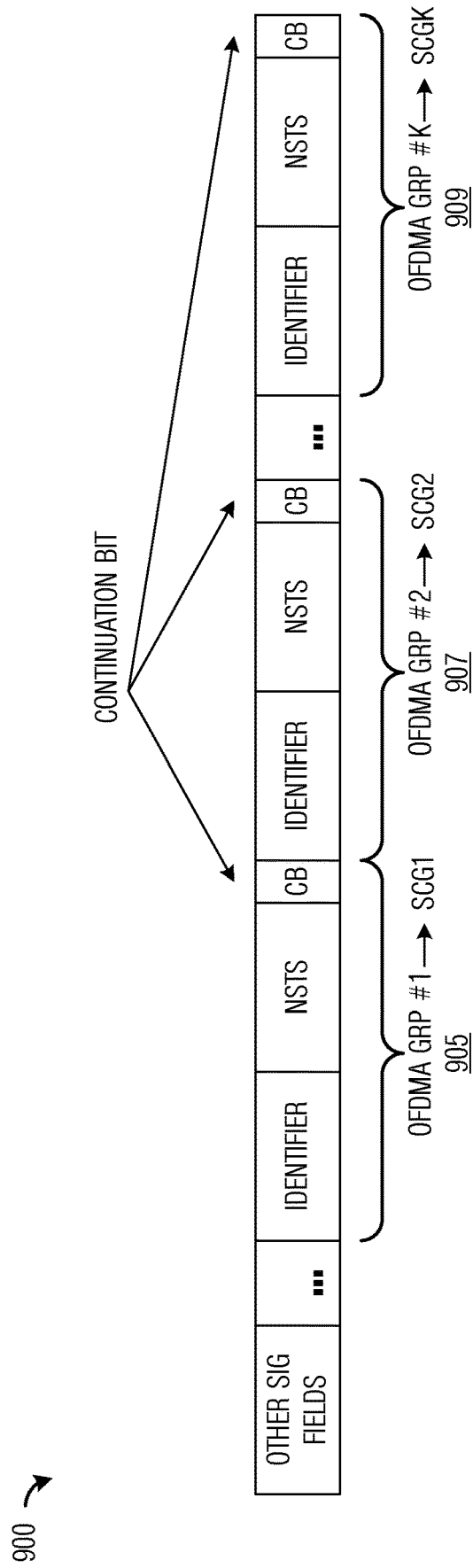
FIG. 9a illustrates a first example structure of a resource allocation part of an OFDMA signal field of an OFDMA frame according to example embodiments described herein.

FIG. 9a illustrates a first example structure of a resource allocation part of an OFDMA PHY preamble 900 of an OFDMA frame. The OFDMA signal field may be OFDMA-SIG A or OFDMA-SIG B or be distributed across both OFDMA-SIG A and OFDMA-SIG B. OFDMA PHY preamble 900 may include other fields, such as OFDMA-STF, OFDMA-LTF, and the like. OFDMA PHY preamble 900 may also include one or more OFDMA allocation elements, such as OFDMA allocation elements 905, 907, and 909. Each of the OFDMA allocation elements may be used to signal OFDMA configuration information for a single group or station. As shown in FIG. 9a, the OFDMA allocation elements follow the format as shown in FIG. 8b.

Figure 9B:
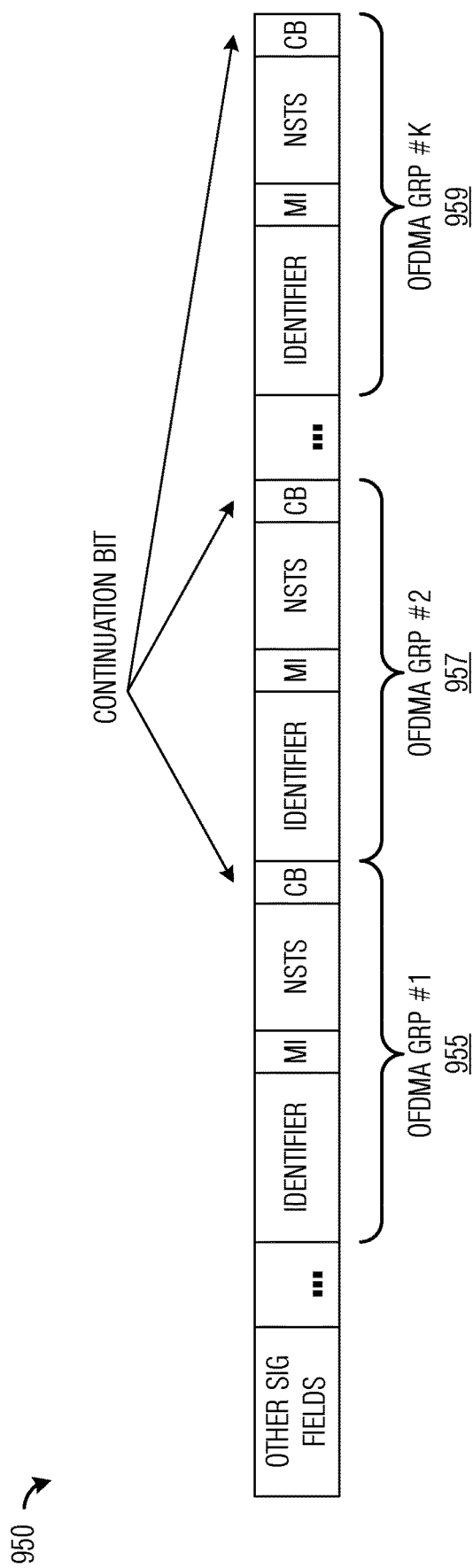
FIG. 9b illustrates a second example structure of a resource allocation part of an OFDMA signal field of an OFDMA frame according to example embodiments described herein.

FIG. 9b illustrates a second example structure of a resource allocation part of an OFDMA PHY preamble 950 of an OFDMA frame. The OFDMA signal field may be OFDMA-SIG A or OFDMA-SIG B or be distributed across both OFDMA-SIG A and OFDMA-SIG B. OFDMA PHY preamble 950 may include other fields, such as OFDMA-STF, OFDMA-LTF, and the like. OFDMA PHY preamble 950 may also include one or more OFDMA allocation elements, such as OFDMA allocation elements 955, 957, and 959. Each of the OFDMA allocation elements may be used to signal OFDMA configuration information for a single group or station. As shown in FIG. 9b, the OFDMA allocation elements follow the format as shown in FIG. 8c.

According to an example embodiment, an OFDMA-SIG B is described as follows:
  Bandwidth (BW) field=BW of the PPDU (2-bits for 20/40/80 MHz);
  OFDM/OFDMA field—1 bit indicator;
  SU-OFDMA/MU-OFDMA field—1 bit indicator;
  For SU-OFDMA:
    STAID is used to identify the STA,
    A STA can be allocated more than one SCG by appearing in the GrpID as many times as needed, and
    NSTS field (currently 12 bits—3 bits per user).
  For MU-OFDMA:
    For each OFDMA group, SCG allocation is determined by the order—maximum number of OFDMA groups cannot exceed the number of SCGs.
      NSTS/Group field (up to 3 bits),
      GrpID field is used to identify a group of users. The size of the group is likely to be fixed at certain size such as 4 STAs, and
      NSTS/user field (currently 12 bits-3 bits/user)—can be reduced based on the number of NSTS allocated per group.
  Continuation field (1-bit indicate the end of the OFDMA-SIG A field).
  The OFDMA-SIG B may also include:
  Other fields—space-time block code (STBC), Coding, modulation and coding system (MCS), etc.
  Can also have MCS per SCG.

According to an alternative example embodiment, SU-OFDMA is treated as a special case of the MU-OFDMA where all NSTS assigned to a group are allocated to a single member of the group. A single GrpID may be used to represent both the SU-OFDMA and the MU-OFDMA case. The GrpID in this uniquely identifies an OFDMA group of 4 stations. In this case the OFDMA signal field has the structure shown in FIG. 9a, 9b, or 9c. Allocation of SCGs to OFDMA groups or single users is achieved based on matching the order of the group/single user in the allocation sequence and the SCG index.

In one example embodiment, the GID field is n bits (e.g., 10 bits) and uniquely identifies OFDMA groups of m (e.g. 4) stations. NSTS is allocated on a per user basis. As an illustrative example, 12 bits are used assuming a maximum of 8 spatial streams and group size of 4 stations. A continuation bit is added to indicate the end of the allocated groups. SU-OFDMA is treated as a special case of MU-OFDMA with NSTS set to 0 as appropriate. This example embodiment is straightforward but may incur some overhead.

Partial association identifier (PAID) (or station AID (STAID)) is used for SU-OFDMA. This may be accommodated by having the first bit of the GID field indicating whether it is GID or PAID/STAID.

Figure 9C:
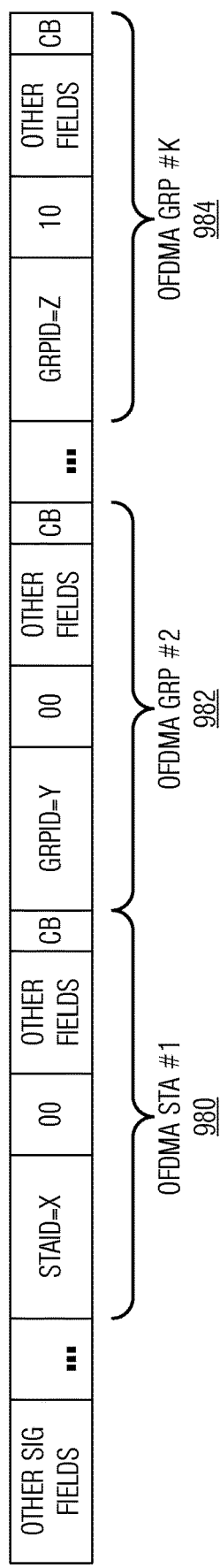
FIG. 9c illustrates a third example structure of a resource allocation part of an OFDMA signal field of an OFDMA frame according to example embodiments described herein.

FIG. 9c illustrates a third example structure of a resource allocation part of an OFDMA PHY preamble 975 of an OFDMA frame. The OFDMA signal field may be OFDMA-SIG A or OFDMA-SIG or be distributed across both OFDMA-SIG A and OFDMA-SIG B. OFDMA PHY preamble 975 may include other fields, such as OFDMA-STF, OFDMA-LTF, and the like. OFDMA PHY preamble 975 may also include one or more OFDMA allocation elements, such as OFDMA allocation elements 980, 982, and 984. The OFDMA allocation elements shown in FIG. 9c are allocated to stations (i.e., for SU-OFDMA operation) and groups (i.e., for MU-OFDMA operation). Referencing the predefined SCG configuration shown in FIG. 5b, a first SCG of size 26 subcarriers is allocated to STAID=x (OFDMA allocation element 980), a second SCG of size 26 subcarriers is allocated to GrpID=y (OFDMA allocation element 982), and a second SCG of size 108 subcarriers is allocated to GrpId=z (OFDMA allocation element 984). The order of the allocation in the indication of the allocation of the OFDMA resource (e.g., the OFDMA resource allocation map) implicitly indicates the allocated SCGs.

Figures 10, 11:
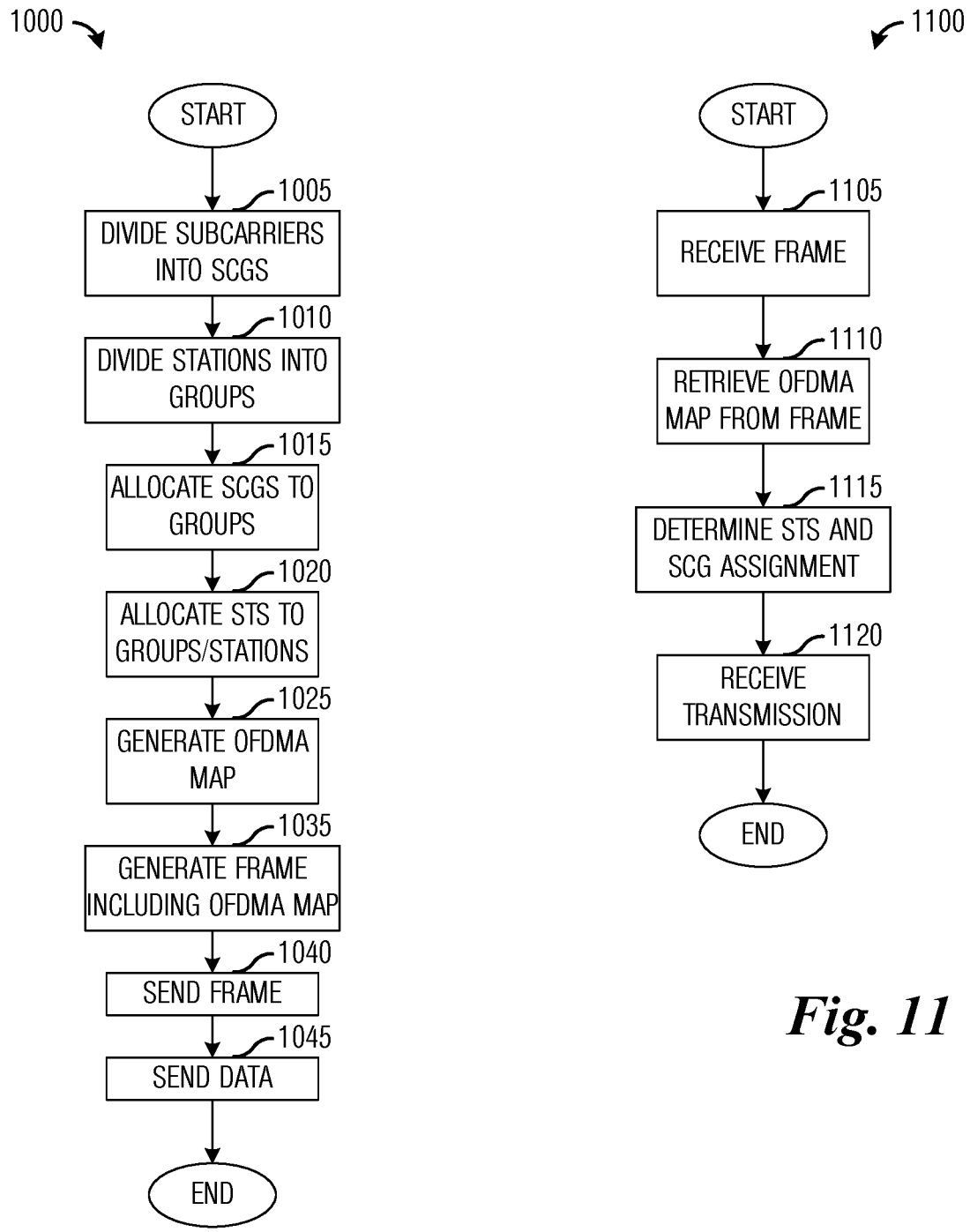
FIG. 10 illustrates a flow diagram of example operations occurring at an AP participating in OFDMA communications according to example embodiments described herein.
FIG. 11 illustrates a flow diagram of example operations occurring at a station participating in OFDMA communications according to example embodiments described herein.

FIG. 10 illustrates a flow diagram of example operations 1000 occurring at an AP participating in OFDMA communications. Operations 1000 may be indicative of operations occurring in an AP as the AP participates in OFDMA communications with one or more stations.

Operations 1000 may begin with the AP dividing available subcarriers into SCGs (block 1005). The subcarriers may be divided into SCGs based on a number of available subcarriers, traffic need, traffic priority, and the like. Alternatively, the SCGs may be predefined, by a technical standard, an operator of the communications system, and the like. The AP may divide stations that it is serving into groups (block 1010). The stations may be divided into groups based on factors such as priority, traffic need, location, proximity, station capability, and the like. A group may include a single station. The AP may allocate SCGs to groups (block 1015). The allocation of the SCGs to groups may be based on criterion such as traffic need, priority, service history, station capability, and the like. The AP may allocate spatial streams STS to the groups (block 1020). The allocation of the spatial streams STS to the groups may be based on traffic need, priority, service history, station capability, and the like. The AP may generate an indication of an allocation of an OFDMA resource, e.g., the spatial streams STS (block 1025). The indication of the allocation of the OFDMA resource may be generated based on the allocations of the SCGs to the groups, as well as the allocations of the STS to the groups. The AP may generate a frame including the indication of the allocation of the OFDMA resource (block 1035). The indication of the allocation of the OFDMA resource may be included in OFDMA allocation element(s) in OFDMA signal fields in the frame. The frame and OFDMA allocation elements may follow the formats as described previously. The AP may transmit the frame (block 1040). The AP may transmit data in accordance with the indication of the allocation of the OFDMA resource (block 1045).

FIG. 11 illustrates a flow diagram of example operations 1100 occurring at a station participating in OFDMA communications. Operations 1100 may be indicative of operations occurring in a station as the station participates in OFDMA communications with an AP.

Operations 1100 may begin with the station receiving a frame (block 1105). The frame may include an indication of an allocation of an OFDMA resource that assigns CSGs and STS to stations and/or groups. The indication of the allocation of the OFDMA resource may be conveyed in OFDMA allocation element(s) in OFDMA signal fields in the frame. The station may retrieve the indication of the allocation of the OFDMA resource from the frame (block 1110). The indication of the allocation of the OFDMA resource may be retrieved from the OFDMA allocation element(s) in the OFDMA signal fields. The station may determine its SCG and STS assignment in accordance with the indication of the allocation of the OFDMA resource (block 1115). The station may receive a data transmission (block 1120). The data transmission may be received in accordance to the assignment of SCG and STS to the station as conveyed in the indication of the allocation of the OFDMA resource. The indication of the allocation of the OFDMA resource may also include additional information to help the station decode the data transmission, such as MCS.

Figure 12:
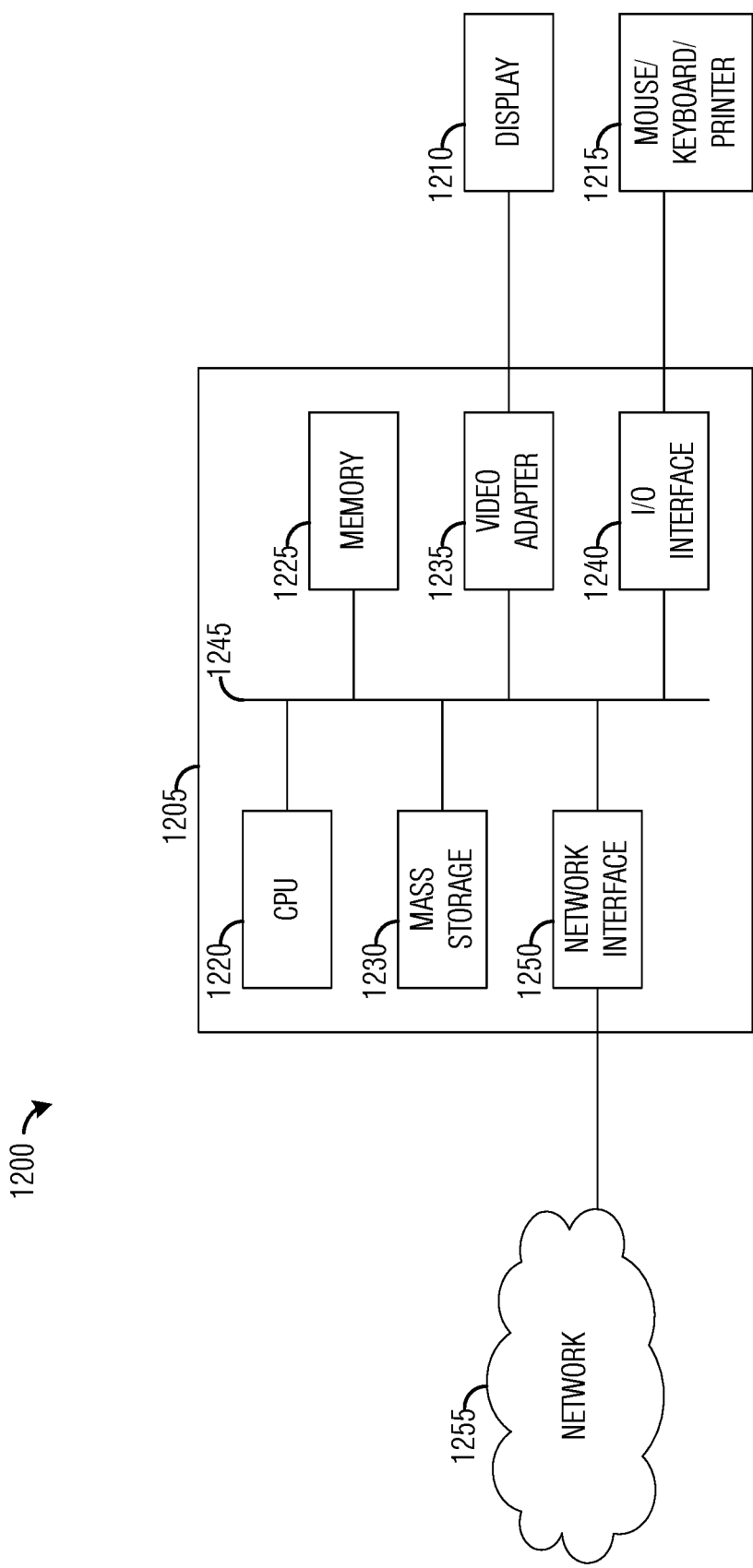
FIG. 12 is a block diagram of a processing system that may be used for implementing the devices and methods disclosed herein.

FIG. 12 is a block diagram of a processing system 1200 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 1205 equipped with one or more input/output devices, such as a human interface 1215 (including speaker, microphone, mouse, touchscreen, keypad, keyboard, printer, and the like), display 1210, and so on. The processing unit may include a central processing unit (CPU) 1220, memory 1225, a mass storage device 1230, a video adapter 1235, and an I/O interface 1240 connected to a bus 1245.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces 1250, which may comprise wired links, such as an Ethernet cable or the like, and/or wireless links to access nodes or different networks 1255. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for orthogonal frequency division multiple access (OFDMA) wireless local area network (WLAN) communications, the method comprising:
   allocating, by a communications device, subcarrier groups to groups of stations to produce subcarrier group allocations;
   allocating, by the communications device, space-time streams to the groups of stations to produce space-time stream allocations;
   generating, by the communications device, an allocation of an OFDMA resource in accordance with the subcarrier group allocations and the space-time stream allocations;
   generating, by the communications device, an OFDMA preamble comprising an OFDMA signal (SIG) field indicating the allocation of the OFDMA resource to a station, the OFDMA SIG field comprising an OFDMA allocation element, the OFDMA allocation element including:
      an identifier field containing a station identifier identifying the station associated with the OFDMA allocation element; and
      a number of space-time streams (NSTS) field containing space-time stream assignments for each station in a group of stations associated with the OFDMA allocation element; and
   transmitting, by the communications device, the OFDMA preamble in a frame.

2. The method of claim 1, wherein the OFDMA preamble further comprises at least one OFDMA-long training field (OFDMA-LTF).

3. The method of claim 1, wherein the OFDMA allocation element includes a modulation and coding scheme (MCS) for each station.

4. The method of claim 1, wherein the OFDMA allocation element includes a multiples (MI) field containing the subcarrier group allocations.

5. The method of claim 4, wherein there is a plurality of OFDMA allocation elements, and wherein indices of the subcarrier group allocations are implicitly indicated by an ordering of the plurality of OFDMA allocation elements.

6. The method of claim 1, wherein the OFDMA allocation element includes a continuation bit field indicating whether the OFDMA allocation element is a last OFDMA allocation element of a plurality of OFDMA allocation elements.

7. The method of claim 1, wherein the OFDMA allocation element includes a subcarrier group category indicating a subcarrier group configuration allocated to the station.

8. The method of claim 7, wherein information related to the subcarrier group configuration is signaled in a management frame.

9. The method of claim 1, wherein the OFDMA SIG field comprises at least one of an OFDMA SIG A field comprising common information for all stations served by the communications device, or an OFDMA SIG B field comprising station-specific information for at least one station served by the communications device.

10. A method for orthogonal frequency division multiple access (OFDMA) wireless local area network (WLAN) communications, the method comprising:
    receiving, by a communications device, a frame including an OFDMA preamble comprising an OFDMA signal (SIG) field indicating an allocation of an OFDMA resource to a station, the OFDMA SIG field comprising an OFDMA allocation element, the OFDMA allocation element including:
       an identifier field containing a station identifier identifying the station associated with the OFDMA allocation element; and
       a number of space-time streams (NSTS) field containing space-time stream assignments for each station in a group of stations associated with the OFDMA allocation element;
    determining, by the communications device, a subcarrier group allocation for the communications device in accordance with the allocation of the OFDMA resource;
    determining, by the communications device, a space-time stream allocation for the communications device in accordance with the allocation of the OFDMA resource; and
    receiving, by the communications device, a data transmission in accordance with the subcarrier group allocation and the space-time stream allocation.

11. The method of claim 10, wherein the OFDMA allocation element includes a modulation and coding scheme (MCS) for each station.

12. The method of claim 10, wherein the OFDMA allocation element includes a multiples (MI) field containing subcarrier group allocations to each station in the group of stations.

13. The method of claim 12, wherein there is a plurality of OFDMA allocation elements, and wherein indices of the subcarrier group allocations are implicitly indicated by an ordering of the plurality of OFDMA allocation elements.

14. The method of claim 10, wherein the OFDMA allocation element includes a continuation bit field containing an indicator indicating whether the OFDMA allocation element is a last OFDMA allocation element of a plurality of OFDMA allocation elements.

15. The method of claim 10, wherein the OFDMA allocation element includes a subcarrier group category indicating a subcarrier group configuration allocated to the station.

16. A communications device providing orthogonal frequency division multiple access (OFDMA) wireless local area network (WLAN) communications, the communications device comprising:
    a non-transitory memory storage comprising instructions; and
    one or more processors in communication with the non-transitory memory storage, wherein the one or more processors execute the instructions to:
       allocate subcarrier groups to groups of stations to produce subcarrier group allocations;
       allocate space-time streams to the groups of stations to produce space-time stream allocations;

generate an indication of an allocation of an OFDMA resource in accordance with the subcarrier group allocations and the space-time stream allocations;

generate an OFDMA preamble comprising an OFDMA signal (SIG) field including the indication of the allocation of the OFDMA resource to a station, the OFDMA SIG field comprising an OFDMA allocation element, the OFDMA allocation element including:

an identifier field containing a station identifier identifying the station associated with the OFDMA allocation element; and a number of space-time streams (NSTS) field containing space-time stream assignments for each station in a group of stations associated with the OFDMA allocation element; and transmitting the OFDMA preamble in a frame.

17. The communications device of claim 16, wherein the OFDMA allocation element includes a modulation and coding scheme (MCS) for each station.

18. The communications device of claim 16, wherein the OFDMA SIG field comprises at least one of an OFDMA SIG A field comprising common information for all stations served by the communications device, or an OFDMA SIG B field comprising station-specific information for at least one station served by the communications device.

19. A communications device providing orthogonal frequency division multiple access (OFDMA) wireless local area network (WLAN) communications, the communications device comprising:

a non-transitory memory storage comprising instructions; and one or more processors in communication with the non-transitory memory storage, wherein the one or more processors execute the instructions to:

receive a frame including an OFDMA preamble comprising an OFDMA signal (SIG) field indicating an allocation of an OFDMA resource to a station, the OFDMA SIG field comprising an OFDMA allocation element, the OFDMA allocation element including an identifier field containing a station identifier identifying the station associated with the OFDMA allocation element, and including a number of space-time streams (NSTS) field containing space-time stream assignments for each station in a group of stations associated with the OFDMA allocation element; and receive a data transmission in accordance with the allocation.

20. The communications device of claim 19, wherein the one or more processors execute the instructions to:

determine a subcarrier group allocation for the communications device in accordance with the allocation;

determine a space-time stream allocation for the communications device in accordance with the allocation; and receive the data transmission in accordance with the subcarrier group allocation and the space-time stream allocation.

21. The communications device of claim 19, wherein the OFDMA allocation element includes a multiples (MI) field containing subcarrier group allocations to each station in the group of stations.

22. The communications device of claim 19, wherein the OFDMA allocation element includes a modulation and coding scheme (MCS) for each station.

* * * * *

UNITED STATES PATENT AND TRADEMARK OFFICE
CERTIFICATE OF CORRECTION

| | |
|---|---|
| PATENT NO. | : 10,615,934 B2 |
| APPLICATION NO. | : 15/952010 |
| DATED | : April 7, 2020 |
| INVENTOR(S) | : Osama Aboul-Magd et al. |

It is certified that error appears in the above-identified patent and that said Letters Patent is hereby corrected as shown below:

On the Title Page

Please insert --(73) Assignee: HUAWEI TECHNOLOGIES CO., LTD., Shenzhen (CN)--.

Signed and Sealed this
Eighteenth Day of August, 2020

Andrei Iancu
*Director of the United States Patent and Trademark Office*